Feb. 2, 1932.   F. W. CUTLER   1,843,208
BELT CONVEYER
Filed Sept. 3, 1929

INVENTOR
FRANK W. CUTLER
BY C. F. Blake
ATTY

Patented Feb. 2, 1932

1,843,208

UNITED STATES PATENT OFFICE

FRANK W. CUTLER, OF PORTLAND, OREGON, ASSIGNOR TO FOOD MACHINERY CORPORATION, OF SAN JOSE, CALIFORNIA, A CORPORATION OF DELAWARE

BELT CONVEYER

Application filed September 3, 1929. Serial No. 390,052.

My invention relates to belt conveyers in general, and is particularly adapted to such conveyers when of extreme width and short distance between end rollers. Under such conditions it has been found very difficult to retain the conveyer belt upon its end rollers, such a belt having a decided tendency to creep transversely of the belt upon the rollers. The usual expedient of crowning the conveyer belt roller is not sufficient and even the expediency of providing sprockets and chains, the latter attached to the edges of the conveyer belt has proved unsatisfactory. Indeed the creeping of the conveyer belt along the rollers has been found sufficient to disengage such a guide chain from its sprockets.

Since in practice it was unsatisfactory to drive a conveyer belt from its rollers, or a belt and attendant chains from the belt rollers and the chain sprockets, it became necessary to provide a driving device for such a conveyer belt that would not cause the belt to creep along the rollers, but would on the contrary prevent such creeping. Such is the object of this invention, which I accomplish by means of the construction illustrated in the accompanying drawings, which is a part of this application for Letters Patent, like characters of reference indicating like parts throughout the several views thereof, and in which:

Figure 1:
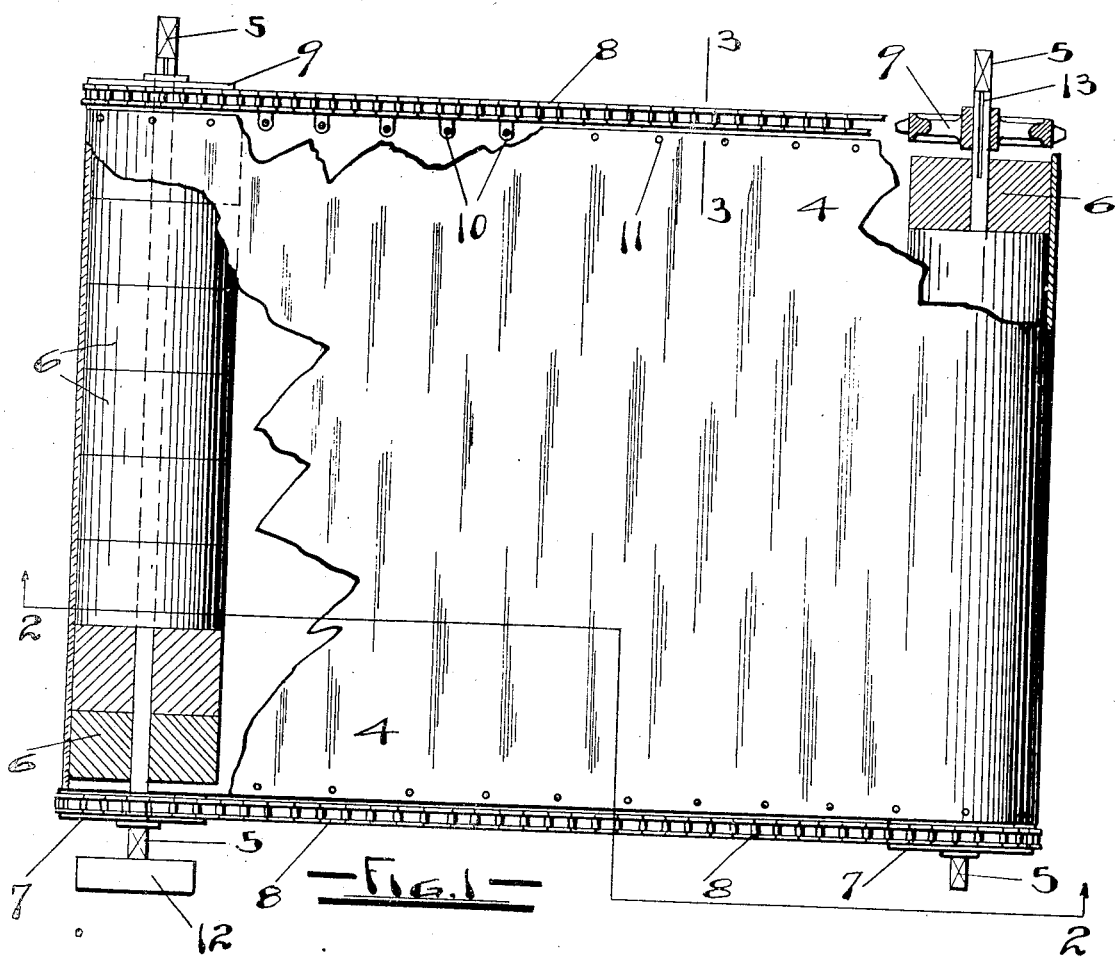
Fig. 1 is a plan view of my invention, with some parts broken away.
Figure 2:
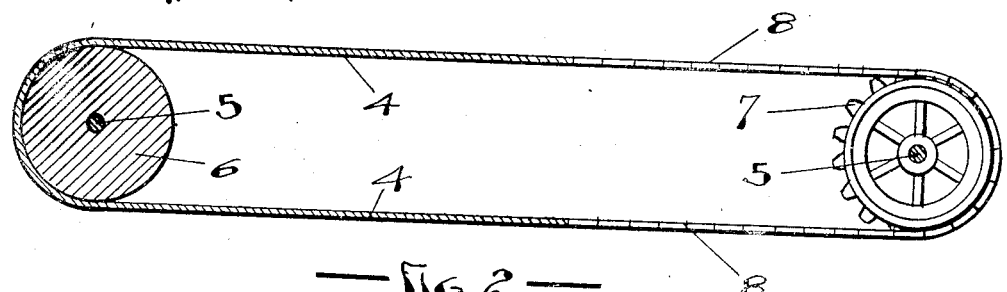
Fig. 2 is a section on line 2—2 of Fig. 1.

The conveyer belt 4 may be of any desired material, whether rubber belting or canvas or other suitable material, and is mounted upon end rollers supported by shafts 5 in the usual manner. Said rollers, however are not of the usual solid construction, nor are they secured upon said shafts for the purpose of driving the belt therefrom. On the contrary the rollers are each divided transversely thereof into discs 6, which discs are placed upon their respective shafts end to end, thus to form a continuous roller along the length of the shaft, as shown in Fig. 1. Also said discs are not secured to their shafts as drive rollers for the belt were in former practice, but on the contrary said discs are each free to rotate upon the shaft.

Figure 3:
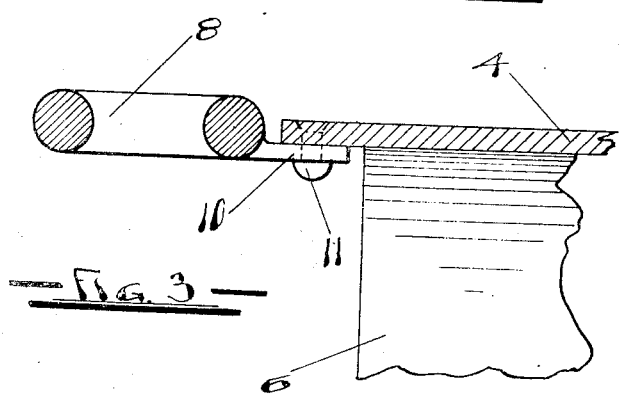
Fig. 3 is a section on line 3—3 of Fig. 1.

Immediately adjacent the conveyer belt 4 sprockets 7 are secured to the respective shafts 5, and a chain 8 is mounted upon said sprockets. A similar set of sprockets 9 and their chain 8 are mounted adjacent the opposite edge of the belt. Said chains 8 are provided with ears upon certain links thereof as shown at 10 in Fig. 1, and the belt 4 is attached to the chains by rivets 11 passed through the edge of the belt and one of said ears, as shown in Fig. 3.

The conveyer may be driven in any convenient and suitable manner, as by a belt upon the pulley 12.

In a belt conveyer of this construction the belt rides upon the several discs 6, but is not driven thereby, and therefore has no tendency to creep along the discs longitudinally of the shafts 5. The chains 8 are driven from the shaft 5 upon which the drive pulley 12 is mounted, and thus the belt 4 is driven through the ears 10 upon said chains.

To provide against transverse shrinkage of the belt 4 in case a shrinkable belt is to be used in a damp position, I mount the sprockets 9 upon their respective shafts 5 by a feather 13 so that said sprockets are rotatably secured to the shaft but longitudinally slidable thereon. Thus in case of belt shrinkage the sprockets 9 and their chain 8 may follow the edge of the belt and thus insure against undue strain upon the belt as well as insuring alinement of the chain 8 and the sprockets 9.

My invention may be made of any size, and constructed of any materials deemed convenient and suitable for such a device, and while I have illustrated a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new and desire to secure by Letters Patent is:

1. A conveying device comprising a pair of substantially parallel shafts, sprockets secured thereon and adapted to turn with said shafts, one sprocket on each shaft having axial movement thereon through a sliding engagement therewith, chain means connecting said sprockets to turn said shafts in unison, freely rotating rollers on said shafts and an endless belt overlying said rollers with means for connecting said belt to said chains whereby movement is imparted thereto.

2. A conveying device comprising a pair of substantially parallel shafts, sprockets secured thereon and adapted to turn with said shafts, two of said sprockets being secured to said shafts by a spline permitting them to have axial movement relative thereto, chains connecting said sprockets to impart uniform travel to said shafts, freely rotating and axially movable rollers on said shafts, an endless belt overlying said rollers, means on said belt and said chains whereby they are connected to move in unison.

3. A conveying device comprising parallel shafts, means on said shafts for imparting rotative movement thereto, rollers on said shafts having free movement axially and circumferentially, a conveying means overlying said rollers, and connecting said shafts, propelling means connecting said shafts and means connecting said propelling means and said conveying means so they will move in unison.

4. In a conveying device comprising the combination of an endless conveying member that is wide compared to its length, means for mounting said member so it will travel continuously and maintain its lateral alignment consistsing of a pair of parallel shafts, rollers on said shafts having free rotation and axial movement thereon, means other than said conveying member for connecting said shafts and driving the same, means for connecting the edges of said conveying member with said driving means so that they will move in unison, with means on said shafts to permit lateral contraction of said conveying means without binding said several means.

5. A conveying device comprising in combination an endless conveying member, a pair of substantially parallel shafts and a series of abutting loose rollers on said shafts and forming a contact for said endless conveyer, drive means connecting said shafts and lying on opposite sides of said endless conveyer, means connecting the edges of said conveyer with said drive means whereby the conveyer is driven entirely by said means, means on said shafts permitting the unrestricted contraction or expansion of said conveying member without binding said connections, the loose rollers on said shafts moving with said conveying member during said contraction or expansion.

6. A conveying device comprising a pair of substantially parallel shafts, sprockets secured thereon and adapted to turn therewith, chain means connecting said sprockets to turn said shafts in unison, freely rotating rollers on said shafts and an endless belt overlying said rollers with means for connecting the edges of said belt to said chains whereby movement is imparted thereto.

7. A conveying device comprising a pair of substantially parallel shafts, sprockets secured thereon and adapted to turn with said shafts, chains connecting said sprockets to impart uniform travel to said shafts, freely rotating and axially movable rollers on said shafts, an endless belt overlying said rollers, means on said belt and said chains whereby they are connected to move in unison.

In witness whereof I claim the foregoing as my own I hereunto affix my signature at Portland, county of Multnomah, State of Oregon, this 28th day of August, 1929.

FRANK W. CUTLER.